(12) United States Patent
Frich

(10) Patent No.: US 8,209,973 B1
(45) Date of Patent: Jul. 3, 2012

(54) WAVE RESPONSIVE ELECTRICAL GENERATOR

(75) Inventor: Mark R. Frich, St. Augusline, FL (US)

(73) Assignee: Wave Electric International, LLC, St. Augustine, FL (US)

( * ) Notice: Subject to any disclaimer, the term of this patent is extended or adjusted under 35 U.S.C. 154(b) by 0 days.

(21) Appl. No.: 13/336,781

(22) Filed: Dec. 23, 2011

Related U.S. Application Data

(60) Provisional application No. 61/542,455, filed on Oct. 3, 2011.

(51) Int. Cl.
*F16D 31/02* (2006.01)
*F03B 13/12* (2006.01)

(52) U.S. Cl. ............ 60/398; 60/495; 417/331; 290/53

(58) Field of Classification Search .................. 60/398, 60/495, 496; 417/331; 290/42, 53
See application file for complete search history.

(56) References Cited

U.S. PATENT DOCUMENTS

| | | | | |
|---|---|---|---|---|
| 748,757 | A * | 1/1904 | Langstroth | 417/331 |
| 817,317 | A * | 4/1906 | Hazel | 417/331 |
| 817,318 | A * | 4/1906 | Hazel | 417/331 |
| 4,076,463 | A * | 2/1978 | Welczer | 417/331 |
| 4,208,878 | A * | 6/1980 | Rainey | 60/496 |
| 4,754,157 | A * | 6/1988 | Windle | 60/495 |
| 5,186,822 | A * | 2/1993 | Tzong et al. | 60/398 |
| 6,812,588 | B1 * | 11/2004 | Zadig | 290/53 |

* cited by examiner

*Primary Examiner* — Michael Leslie
(74) *Attorney, Agent, or Firm* — Thomas C. Saitta

(57) ABSTRACT

A wave responsive electrical generator device having a buoyant member connected to an anchor by a tether line member, the line member passing through a sheave mounted within the buoyant member and descending to a counterweight, whereby vertical motion of the buoyant member results in rotation of the sheave, which in turn operates hydraulic cylinders to deliver hydraulic fluid under pressure to an hydraulic motor, which drives an electrical generator.

16 Claims, 4 Drawing Sheets

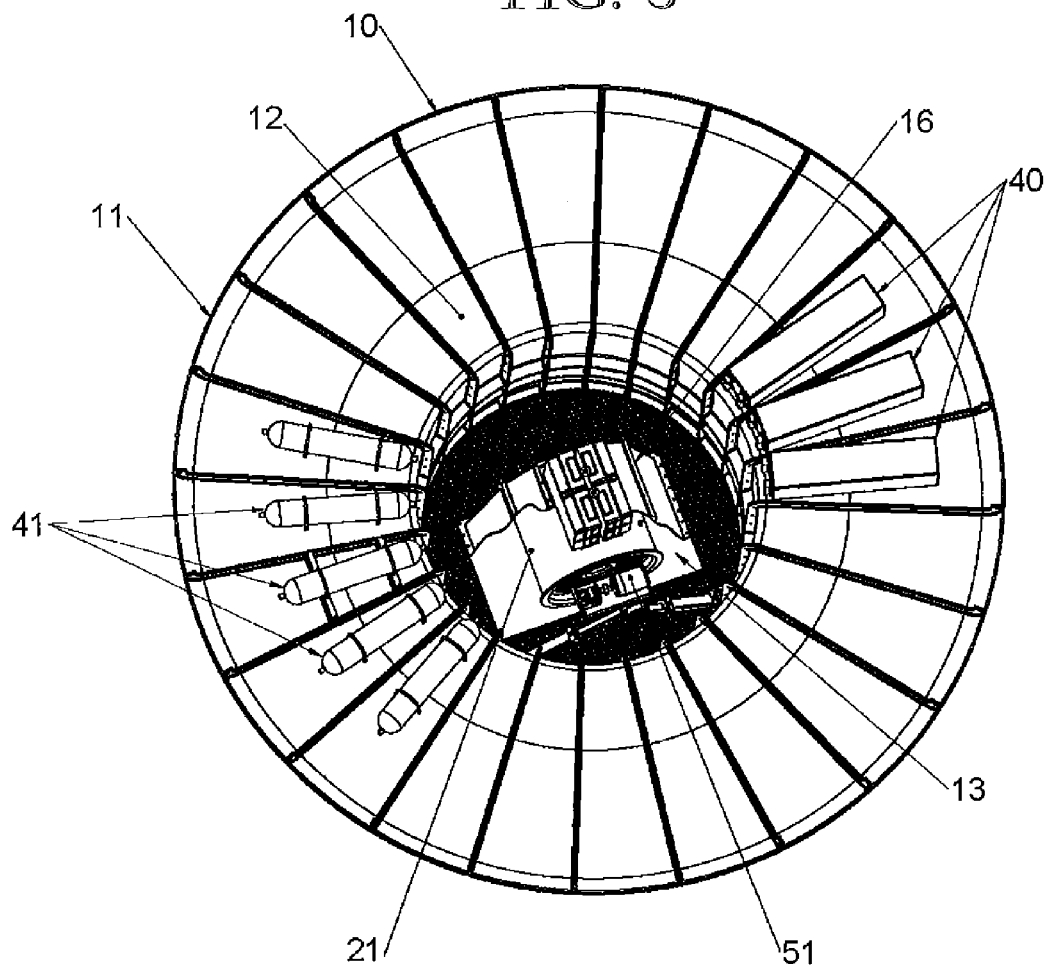

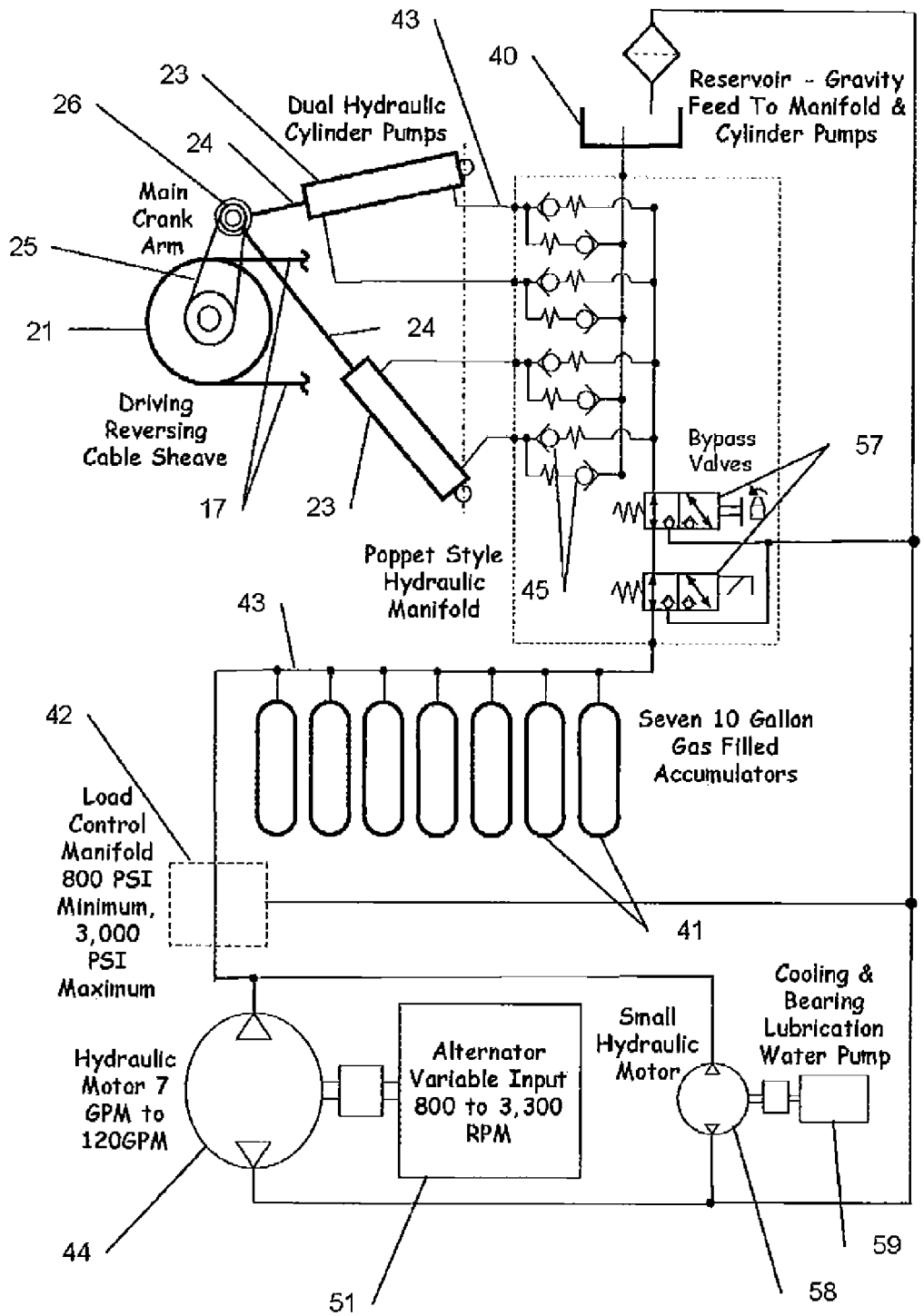

WAVE RESPONSIVE ELECTRICAL GENERATOR

This application claims the benefit of U.S. Provisional Patent Application Ser. No. 61/542,455, filed Oct. 3, 2011, the disclosure of which is incorporated herein by reference.

BACKGROUND OF THE INVENTION

This invention relates generally to the field of wave responsive electrical generators, and more particularly relates to offshore generators comprising buoyant members that harness energy from waves and swells occurring in large bodies of water, particularly the ocean.

Tides, currents, wind and other weather events impart energy to large bodies of water that result in surface swells and waves. A buoyant object will rise and fall with these waves and swells. There have been many attempts to utilize the energy of the waves and swells to generate electricity, typically by harnessing the vertical reciprocal motion of the buoyant object to operate an electrical generator.

It is an object of this invention to provide a wave and swell responsive electrical generator distinct from the previous systems, the wave and swell responsive electrical generator assembly comprising an anchored buoyant member, the buoyant member being connected to the anchor member by a tether line, such as a cable, chain or belt, passing through a sheave positioned in the buoyant member, the tether line then descending to a counterweight, whereby vertical motion of the buoyant member in either direction results in rotation of the sheave and movement of hydraulic cylinders to drive an hydraulic motor that drives an electrical generator.

SUMMARY OF THE INVENTION

In a basic sense, the wave responsive electrical generator comprises a buoyant member connected to an anchor by a tether line member, the line member passing through a sheave mounted within the buoyant member and descending to a suspended counterweight, whereby vertical motion of the buoyant member results in rotation of the sheave, which in turn operates hydraulic cylinders to deliver hydraulic fluid under pressure to an hydraulic motor, which drives an electrical generator. Gas pressurized hydraulic accumulator tanks are provided in line between the hydraulic cylinders and the hydraulic cylinder such that the hydraulic fluid is provided to the hydraulic motor at a steady flow rate. With this structure, power is extracted during both the rising and falling of the buoyant member. Preferably, the buoyant member comprises a flotation housing with an upper body and a lower body, the upper body being generally disk-shaped and the lower body being generally cylindrical, the diameter of the upper body being significantly greater than the diameter of the lower body. The line member may comprise a cable, chain, wire, belt, ridged belt or like member, and the counterweight is provided with a line encircling assembly, such that the counterweight moves up and down the portion of the line member extending from the anchor to the buoyant member.

BRIEF DESCRIPTION OF THE DRAWINGS

FIG. 3 is an exposed top view of the buoyant member.

FIG. 4 is a schematic showing a representative hydraulic system.

DETAILED DESCRIPTION OF THE INVENTION

Figure 1:
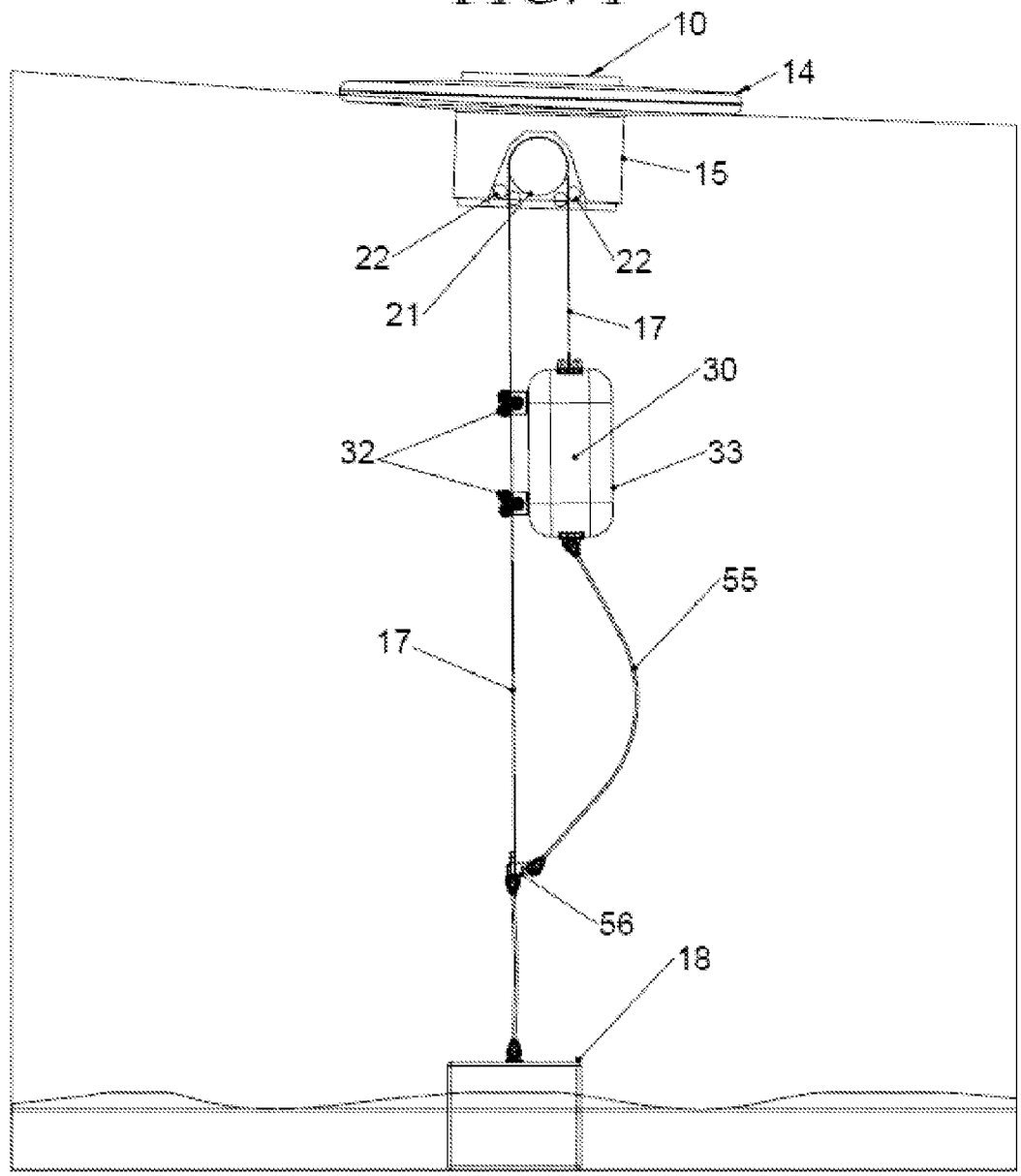
FIG. 1 shows the buoyant member, counterweight member, anchor member and line member of the wave responsive electrical generator as deployed in a body of water.
Figure 2:
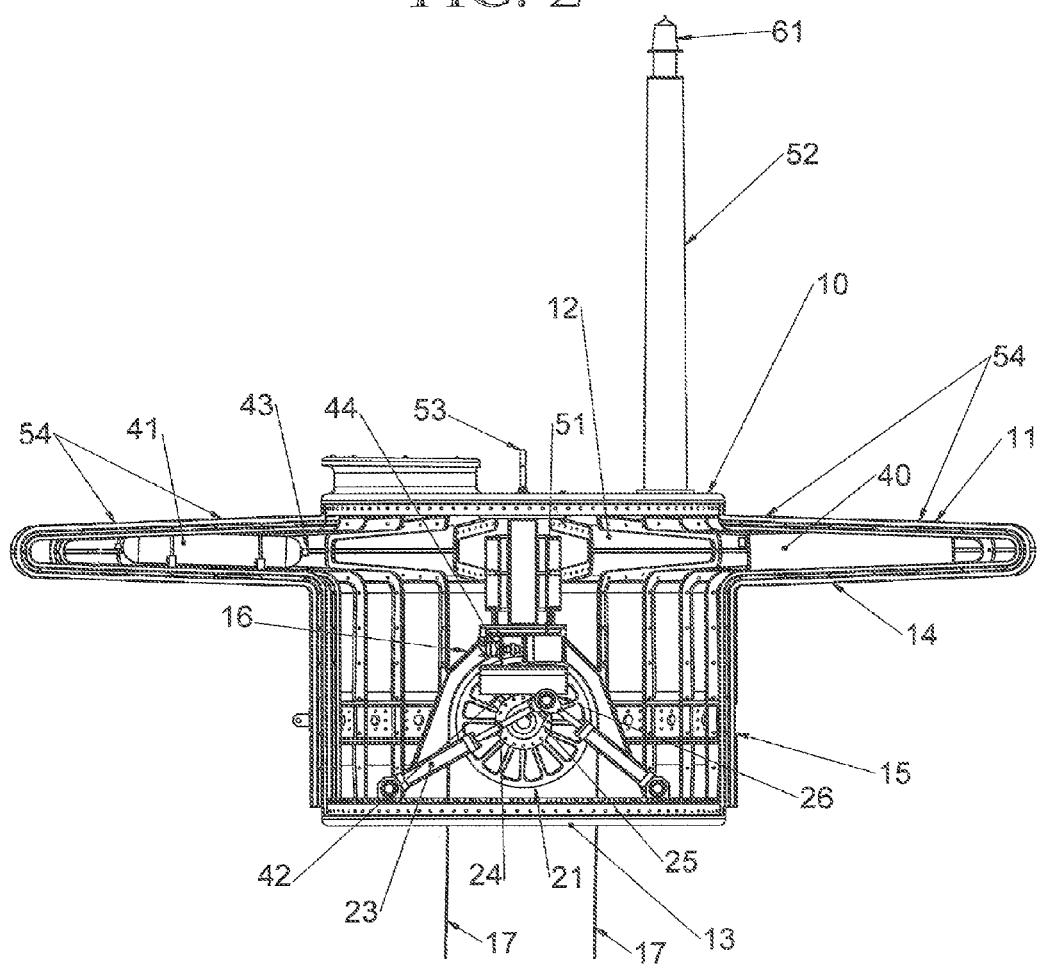
FIG. 2 is a cross-sectional, exposed side view of the buoyant member.

With reference to the drawings, the wave responsive electrical generator will be described with regard for the best mode and preferred embodiments. The term "wave" shall be used hereinafter to refer to a wave, swell or other recurring, periodic or non-periodic, rising and falling of the surface of the water in which the wave responsive electrical generator is utilized.

In a general sense, the wave responsive electrical generator device or assembly comprises a buoyant member connected to an anchor by a tether line member, the line member passing through a sheave mounted within the buoyant member and descending to a suspended counterweight, whereby vertical motion of the buoyant member results in rotation of the sheave, which in turn operates hydraulic cylinders to deliver hydraulic fluid under pressure to an hydraulic motor, which drives an electrical generator. Gas pressurized hydraulic accumulator tanks are provided in line between the hydraulic cylinders and the hydraulic cylinder such that the hydraulic fluid is provided to the hydraulic motor at a steady flow rate. With this structure, power is extracted during both the rising and falling of the buoyant member. Preferably, the buoyant member comprises a flotation housing with an upper body and a lower body, the upper body being generally disk-shaped and the lower body being generally cylindrical, the diameter of the upper body being significantly greater than the diameter of the lower body. The line member may comprise a cable, chain, wire, belt, ridged belt or like member, or multiples or combinations thereof, and the term "line" shall be taken herein to refer to any such member. The counterweight is provided with a line encircling assembly, such that the counterweight moves up and down the portion of the line member extending from the anchor to the buoyant member in response to up and down movement of the buoyant member.

The buoyant member 10 is a structure designed and constructed so as to float at or on the surface of water, such as in an ocean. The buoyant member 10 comprises a flotation housing 11 forming a shell or body that provides an internal cavity 12 to receive some of the operational, electrical and other components of the wave responsive electrical generator. The buoyant member 10 is provided with a bottom opening 13, a waterproof waterbox housing 16 being mounted at the bottom opening 13, the waterbox housing 16 being disposed internally within the flotation housing 11, such that the waterbox housing 16 ingress of water into the portions of the internal cavity 12 of the flotation housing 11 that contains some of the operational, electrical and other components of the electrical generating system.

The shape and configuration of the buoyant member 10 may vary, but preferred embodiments will have a shape that is symmetrical and generally circular in lateral cross-section, such as a sphere, cylinder or dome. In a more preferred embodiment, the flotation housing 10 of the buoyant member 10 has an upper body 14 and a lower body 15. The upper body 14 is generally disk-shaped with a diameter significantly greater than its height, while the lower body 15 is generally cylindrical, such that the upper body 14 may be considered an annular flange extending from the upper portion of the lower body 15. The width or diameter of the lower body 15 is significantly smaller than largest width of diameter of the upper body 14, with a ratio of approximately 1:2.5 being suitable. With this configuration, the buoyant member 10 is indifferent to wave and wind direction, is highly stable in rough conditions where wave capping or significantly large waves are encountered, and is able to react strongly to rising waves in a controlled manner. In relatively calm water, the lower body 14 of the buoyant member 10 will be completely or almost completely submerged while the upper body 15 resides at or above the water surface. When encountering small or gentle waves the upper body 15 may remain above the water, but when large, violent or rapid waves are encountered, the upper body 15 will initially submerge, thereby presenting a much greater surface area to the wave energy, resulting in powerful vertical movement of the buoyant member 10 upward along line member 17.

The buoyant member 10 is tethered to the floor of the ocean by a line member 17 extending from an anchor member 18 disposed on the floor. The line member 17 may comprise a cable, wire, belt, line, toothed or ridged belt, or multiples or combinations of such, or similar members of suitable strength and material composition. The line member 17 must possess durability in the water environment and must be capable of providing sufficient traction or friction when combined with the main drive sheave 21. The preferred embodiment of the line member 17 comprises a toothed or ridged belt, such that mechanical interlocking with a toothed or ridged main drive sheave 21 is provided. The line member 17 extends from the anchor member 18 to the buoyant member 10, passing through the bottom opening 13 and into the interior of the waterbox housing 16. The line member 17 passes over a main drive sheave 21 and continues downward to be connected to a suspended counterweight or drive member 30, the counterweight member 20 being suspended sufficient distance above the ocean floor such that it will not contact the floor when the buoyant member 10 is at its shortest distance above the floor. A plurality of guide or idler sheaves 22 may be positioned within the waterbox housing 16 to better control the line member 17 during vertical movement of the buoyant member 10.

The counterweight 30 is provided with a means for securing or slidingly mounting the counterweight member 30 along the portion of the line member 17 extending between the anchor member 18 and the buoyant member 10, such as a line encircling assembly 31, whereby the counterweight member 30 is attached to the line member 17 in a manner that allows the counterweight member 30 to move up and down along the line member 17 extending between the anchor member 18 and the buoyant member 10. The line encircling assembly 31 may comprise, for example, a vertical bore or a plurality of guide pulleys 32 that receive the line member 30 therethrough in order to maintain attachment of the counterweight member 30 to the line member 17 without restricting vertical movement of the counterweight member 30. The counterweight member 30 may be provided with a rudder member 33, or may be structured to have a similar outer shape, whereby the counterweight member 30 will orient itself in the direction of any current present in the environment.

With this design, the counterweight member 30 keeps the line member 17 taut and securely in contact with the main drive sheave 21 as the counterweight slides up and down on the line member 17. As the buoyant member 10 rises on a wave, the counterweight member 30 is pulled upward due to the increased distance between the anchor member 18 and the buoyant member 10. As the buoyant member 10 descends, the counterweight member 30 likewise descends due to the decreased distance between the anchor member 18 and the buoyant member 10.

The main drive sheave 21 is mounted on a wall of the waterbox housing 16 and can rotate in either direction in response to movement of the line member 17 as the buoyant member 10 rises or falls. The main drive sheave 21 may comprise for example an annularly grooved wheel for use with a line member 17 comprising a cable, line or belt, wherein friction between the line member 17 and the main drive sheave 21 results in rotation of the main drive sheave 21 when the line member 17 moves, or may comprise, preferably for example, a toothed or ridged gear or pulley for use with a line member 17 comprising a chain, toothed or ridged belt, temporary mechanical interlocking between the line member 17 and the main drive sheave 21 resulting in rotation of the main drive sheave 21 when the line member 17 moves.

Rotational movement of the main drive sheave 21 is translated into reciprocal linear movement of at least two hydraulic cylinders 23. As shown, the pistons 24 of the hydraulic cylinders 23 may be connected to a sheave crank aim 25 mounted onto the main drive sheave 21 by a rotating connection assembly 26, such a for example a bearing assembly. Rotational movement of the main drive sheave 21 results in either extension or retraction of the pistons 24, and the pistons 24 will be driven both when the buoyant member 10 rises to produce rotation of the main drive sheave 21 in one direction and when the buoyant member descends to produce rotation in the other direction. The hydraulic cylinders 24 deliver hydraulic fluid from a reservoir 40 through a plurality of gas pressurized hydraulic fluid accumulator tanks 41 to an hydraulic motor 44, hydraulic fluid conduits 43, check valves 45 and a load control manifold 42 being provided to control and direct the flow of hydraulic fluid to the hydraulic motor 44 and back into the hydraulic fluid reservoir 40. The accumulator tanks 41 may comprise, for example, tanks having gas-filled bladders which are compressed by hydraulic fluid forced into the tanks 41, such that the bladders are used to expel the hydraulic fluid when desired. The load control manifold 42 may be of any suitable type, and may utilize servo valves or simple on/off valves. The accumulator tanks 41 and load control manifold 42 insure that the hydraulic fluid is delivered to the hydraulic motor 44 in a steady manner, since fluid flow from the hydraulic cylinders 23 will be intermittent and pulsing, will vary in the amount of force being delivered. Reserve pressure in the accumulator tanks 41 is utilized to deliver hydraulic fluid to the hydraulic motor 44 at times when there is insufficient vertical movement of the buoyant member 10 to provide sufficient pressure from the action of the hydraulic cylinders 23 alone. The hydraulic motor 44 drives an electrical generator 51 to create electricity which is delivered through electrical conduits (not shown) to a shore line grid system. When multiple wave responsive electrical generators are provided in a grouping, the electricity may first be delivered to a power synchronizing system.

Vertical movement of the buoyant member 10 that creates excess fluid flow from the hydraulic cylinders 23 beyond the amount necessary to operate the hydraulic motor 44 is utilized to refill and re-pressurize the accumulator tanks 41. The accumulator tanks 41 are provided with pressure release valves to cycle hydraulic fluid back to the hydraulic fluid reservoir 40 as needed. Furthermore, the hydraulic system may further comprise controlled or automatic bypass valves 57 to route hydraulic fluid from the hydraulic cylinders 23 directly back to the hydraulic fluid reservoir 40 if necessary. A secondary hydraulic motor 58 of lesser power may be provided to operate cooling and bearing lubrication pumps 59.

Visible markers 61, radio transmitting equipment 52 or lifting connectors 53 may be provided on the upper side of the buoyant member. Additionally, the solar panels 54 may be positioned atop the buoyant members 10 to supplement electrical production. Various shock absorbing devices may be provided on the line member 17 or the counterweight member 30 to preclude damage during extreme wave action. Safety cables 55, float or diver connection members 56 and the like may be provided on the line member 17 and counterweight member 30 for use when installing, repairing or removing the wave responsive electrical generator. Preferably, the diver connection member 56 is positioned no lower than 100 feet from the water surface.

For purposes of providing a representative example, not meant to be limiting and with all dimensions and weights being approximates, the buoyant member 10 may have a height of eight feet, the upper body 14 having a height of 1.5 feet and the lower body having a height of 6.5 feet, with a maximum upper body 14 diameter of twenty four feet and a maximum lower body 15 diameter of ten feet. As described above, the buoyant member 10 containing its operational components may weigh 7500 pounds. The line member 17 may extend from fifty to hundreds of feet. An anchor member 18 of 80,000 pounds and a counterweight member 30 of 5300 pounds is suitable for use with a buoyant member 10 of the given size and weight. Obviously, the weight of the anchor member 18 and the counterweight member 30 will vary depending on the size and weight of the buoyant member 10.

In three offshore tests at different locations it has been found that wave heights averaged 3.4, 8.1 and 12.1 feet and wave periodicity averaged 5.13, 7.1 and 7.1 seconds, respectively. Using the first set of numbers, this means that the buoyant member 30 would have vertical movement totaling almost eight miles over a one year period. A single wave responsive electrical generator as described above and having a 10,000 pound counterweight member 30 could theoretically produce a horsepower of between 24 and 42 HP at the three sites.

It is understood that equivalents and substitutions for elements set forth descriptively above may be obvious to those skilled in the art, and therefore the true scope and definition of the invention is to be as set forth in the following claims.

I claim:

1. A wave responsive electrical generator device comprising:
   an anchor member;
   a buoyant member comprising a disk-shaped upper body and a lower body, the width of the lower body being less than the width of the upper body, a rotatable main drive sheave, an hydraulic motor operated by said main drive sheave, an electric generator operated by said hydraulic motor, and an hydraulic reservoir containing hydraulic fluid;
   a counterweight member; and
   a line member extending from said anchor member through said buoyant member and to said counterweight member, said line member being received by said main drive sheave, whereby movement of said line member resulting from up and down movement of said buoyant member relative to said anchor member causes rotation of said main drive sheave, operation of said hydraulic motor and operation of said electrical generator to produce electricity.

2. The device of claim 1, further comprising hydraulic cylinders connected to said main drive sheave, gas pressurized hydraulic fluid accumulator tanks, and hydraulic fluid conduits connecting said hydraulic cylinders to said accumulator tanks and said accumulator tanks to said hydraulic motor.

3. The device of claim 1, wherein said lower body is cylindrical.

4. The device of claim 1, wherein the ratio of the width of the lower body to the width of the upper body is approximately 1:2.5.

5. The device of claim 2, further comprising a sheave crank arm connecting said hydraulic cylinders to said main drive sheave.

6. The device of claim 1, said counterweight member further comprising a line encircling assembly connecting said counterweight member to said line member between said anchor member and said buoyant member, said line encircling assembly allowing vertical movement of said counterweight along said line member between said anchor member and said buoyant member in response to vertical movement of said buoyant member.

7. The device of claim 6, wherein said line encircling assembly comprises guide pulleys receiving said line member.

8. The device of claim 1, wherein said main drive sheave and said line member mechanically interlock.

9. The device of claim 8, wherein said main drive sheave is toothed or ridged and said line member is a toothed or ridged belt.

10. A wave responsive electrical generator device comprising:
    an anchor member;
    a buoyant member comprising a disk-shaped upper body and a lower body, the width of the lower body being less than the width of said upper body, a rotatable main drive sheave, hydraulic cylinders connected to said main drive sheave, said hydraulic cylinders delivering hydraulic fluid through hydraulic conduits to an hydraulic motor, said hydraulic motor driving an electric generator;
    a counterweight member; and
    a line member extending from said anchor member through said buoyant member and to said counterweight member, said line member being received by said main drive sheave, whereby movement of said line member resulting from up and down movement of said buoyant member relative to said anchor member causes rotation of said main drive sheave such that said hydraulic cylinders deliver hydraulic fluid to said hydraulic motor, which in turn drives said electric generator to produce electricity.

11. The device of claim 10, further comprising a sheave crank arm mounted to said main drive sheave, said hydraulic cylinders being connected to said sheave crank arm by a rotating connection assembly.

12. The device of claim 10, further comprising gas pressurized hydraulic fluid accumulator tanks, wherein said hydraulic fluid is stored in said accumulator tanks prior to delivery to said hydraulic motor.

13. The device of claim 10, said counterweight member further comprising a line encircling assembly connecting said counterweight member to said line member between said anchor member and said buoyant member, said line encircling assembly allowing vertical movement of said counterweight along said line member between said anchor member and said buoyant member in response to vertical movement of said buoyant member.

14. The device of claim 13, wherein said line encircling assembly comprises guide pulleys receiving said line member.

15. The device of claim 10, wherein said main drive sheave and said line member mechanically interlock.

16. A wave responsive electrical generator device comprising:
    an anchor member;

a buoyant member comprising a disk-shaped upper body and a lower body, the width of the lower body being less than the width of said upper body, a rotatable main drive sheave, hydraulic cylinders connected to said main drive sheave by a sheave crank arm, said hydraulic cylinders delivering hydraulic fluid through hydraulic conduits to a plurality of gas pressurized hydraulic fluid accumulator tanks, said accumulator tanks delivering hydraulic fluid to an hydraulic motor, said hydraulic motor driving an electric generator;

a counterweight member comprising a line encircling assembly connecting said counterweight member to said line member between said anchor member and said buoyant member, said line encircling assembly allowing vertical movement of said counterweight along said line member between said anchor member and said buoyant member in response to vertical movement of said buoyant member; and a line member extending from said anchor member through said buoyant member and to said counterweight member, said line member being received around said main drive sheave, whereby movement of said line member resulting from up and down movement of said buoyant member relative to said anchor member causes rotation of said main drive sheave such that said hydraulic cylinders deliver hydraulic fluid to said hydraulic motor, which in turn drives said electric generator to produce electricity.

* * * * *